(12) United States Patent
Callahan

(10) Patent No.: US 6,380,985 B1
(45) Date of Patent: Apr. 30, 2002

(54) RESIZING AND ANTI-FLICKER FILTERING IN REDUCED-SIZE VIDEO IMAGES

(75) Inventor: Sean Callahan, St. Paul, MN (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/153,434

(22) Filed: Sep. 14, 1998

(51) Int. Cl.[7] .................................................. H04N 5/21
(52) U.S. Cl. ........................ 348/607; 348/581; 348/910
(58) Field of Search ................................. 348/458, 452, 348/459, 910, 581, 448, 607, 615

(56) References Cited

U.S. PATENT DOCUMENTS

| | | | | |
|---|---|---|---|---|
| 4,298,896 A | * | 11/1981 | Heitman ...................... 360/11 |
| 4,766,494 A | * | 8/1988 | Doyle ......................... 348/458 |
| 4,791,487 A | * | 12/1988 | Kozuki et al. ............... 358/140 |
| 4,941,045 A | * | 7/1990 | Birch .......................... 358/140 |
| 5,049,993 A | * | 9/1991 | LeGall et al. ............... 358/140 |
| 5,057,919 A | * | 10/1991 | de Haan ..................... 358/136 |
| 5,343,299 A | * | 8/1994 | Ishikawa ..................... 348/458 |
| 5,966,166 A | * | 10/1999 | Coutinho et al. ............ 348/15 |

* cited by examiner

Primary Examiner—Victor R. Kostak
(74) Attorney, Agent, or Firm—Lee & Hayes, PLLC

(57) ABSTRACT

A system for processing a video data stream has a data input to receive a video data stream with first and second fields of interlaced scan lines. The system has a resizing and filtering component to remove the first field of interlaced scan lines, thereby reducing the quantity of video data by one-half. The resizing and filtering component then resizes the remaining second field of interlaced scan lines by averaging pairs of sequential scan lines to produce averaged line pairs. Thereafter, the resizing and filtering component filters the averaged line pairs to remove any unwanted interlace flickering.

21 Claims, 3 Drawing Sheets

RESIZING AND ANTI-FLICKER FILTERING IN REDUCED-SIZE VIDEO IMAGES

TECHNICAL FIELD

The present invention relates to systems for displaying video images and methods for reducing and filtering the video images.

BACKGROUND

Modern-day television sets offer many options for the viewer. One option is known as the "picture-in-picture" or "PIP" feature in which a reduced-size video image for one channel is overlaid on a fall-size video image for another channel.

To shrink a video image from full-size to reduced-size, the hardware typically removes some of the video data. For example, a video input stream for fall-size images might comprise pixel data for a 640×480 pixel display, whereas the reduced size images might only require data for a 160×120 area. Elimination of data often results in noticeable differences between pixels in a scan line, or between one scan line and the next. Smooth transition between pixels is lost and the overall image appears to "flicker". The "flicker" artifact is particularly noticeable in the situation where a horizontal scan line differs noticeably from neighboring scan lines above and below.

One solution is to use simple graphics hardware or optimized software to perform drop sampling on the large image, discarding pixels to create the smaller image. Unfortunately, this solution introduces a significant amount of aliasing, which is particularly noticeable in video with a large degree of motion. The aliasing also introduces interlace flickering.

Another solution is to employ complex graphics hardware to perform de-interlacing and multi-tap filtering on the video stream at real-time rates. This solution requires significant memory bandwidth to read pixels multiple times for use in the filtering process. Unfortunately, this solution comes with a high price tag.

Accordingly, there is a need for a technique that reduces image size while minimizing aliasing and removing interlace flicker, yet can be implemented using simple graphics hardware or optimized software.

SUMMARY

This invention concerns systems and methods for resizing and filtering a video data stream to produce a reduced-size display image while minimizing aliasing and removing interlace flicker. The techniques may be implemented using simple graphics hardware or optimized software.

In one implementation, a system for processing a video data stream has a data input to receive the video data stream. The video data stream has odd and even fields of interlaced scan lines. The system also has a resizing and filtering component that processes video data stream to reduce the size of the image when displayed and to remove interlace flickering.

The resizing and filtering component initially removes the odd (or even) field of interlaced scan lines, thereby reducing the quantity of video data by one-half. The resizing and filtering component then resizes and filters the remaining second field of interlaced scan lines as follows:

$$(\text{Line}_{index+1-ratio})/4+(\text{Line}_{index}+\text{Line}_{index+1})/4+(\text{Line}_{index+ratio})/4$$

wherein "Line" is a scan line, "Ratio" is an amount of scaling to be performed, and "Index" is a scan line number that starts at zero and increments in steps of the "Ratio".

For a case involving six sequential odd (or even) scan lines A–F and a reduction factor of 2:1, the above resize and filter process reduces to:

$$(B+C+D+E)/4.$$

For a case involving six sequential odd (or even) scan lines A–F and a reduction factor of 3:2, the above resize and filter process reduces to:

$$B/2+C/4+D/4 \text{ and } C/4+D/4+E/2.$$

The resizing and filtering component is beneficial in that it requires few input samples (e.g., only four input pixels for each output pixel) in comparison to a fall, multi-tap filter. As a result, the component can be implemented in software or simple hardware with few shift and add operations. Yet, the low cost component still effectively reduces the flicker artifact in the reduced-size image.

DETAILED DESCRIPTION

This invention concerns a system for resizing and filtering a video stream to produce a reduced-size display image. The invention is described generally in the television context, although aspects may be implemented in other image display systems, such as computer monitors, instrumentation displays, and other raster-scanning display devices.

This invention is also described generally in the context of thin clients and more specifically, in a context of a set-top box (STB). In particular, aspects of this invention may be implemented in a system that integrates Web access and television so that users can access Web content on the Internet through a standard television set. The system includes a set-top box having a television tuner and standard network interface devices to enable simultaneously viewing of both television programs and web programming. One example of this system is the "WebTV®" Internet system, maintained by WebTV Networks, Inc. of Palo Alto, Calif. It is noted, however, that aspects of this invention may be implemented in contexts other than television and set-top boxes.

It is further noted that the methods described below may be implemented in software, firmware, hardware, or a combination of software and hardware.

Exemplary Television System

Figure 1:
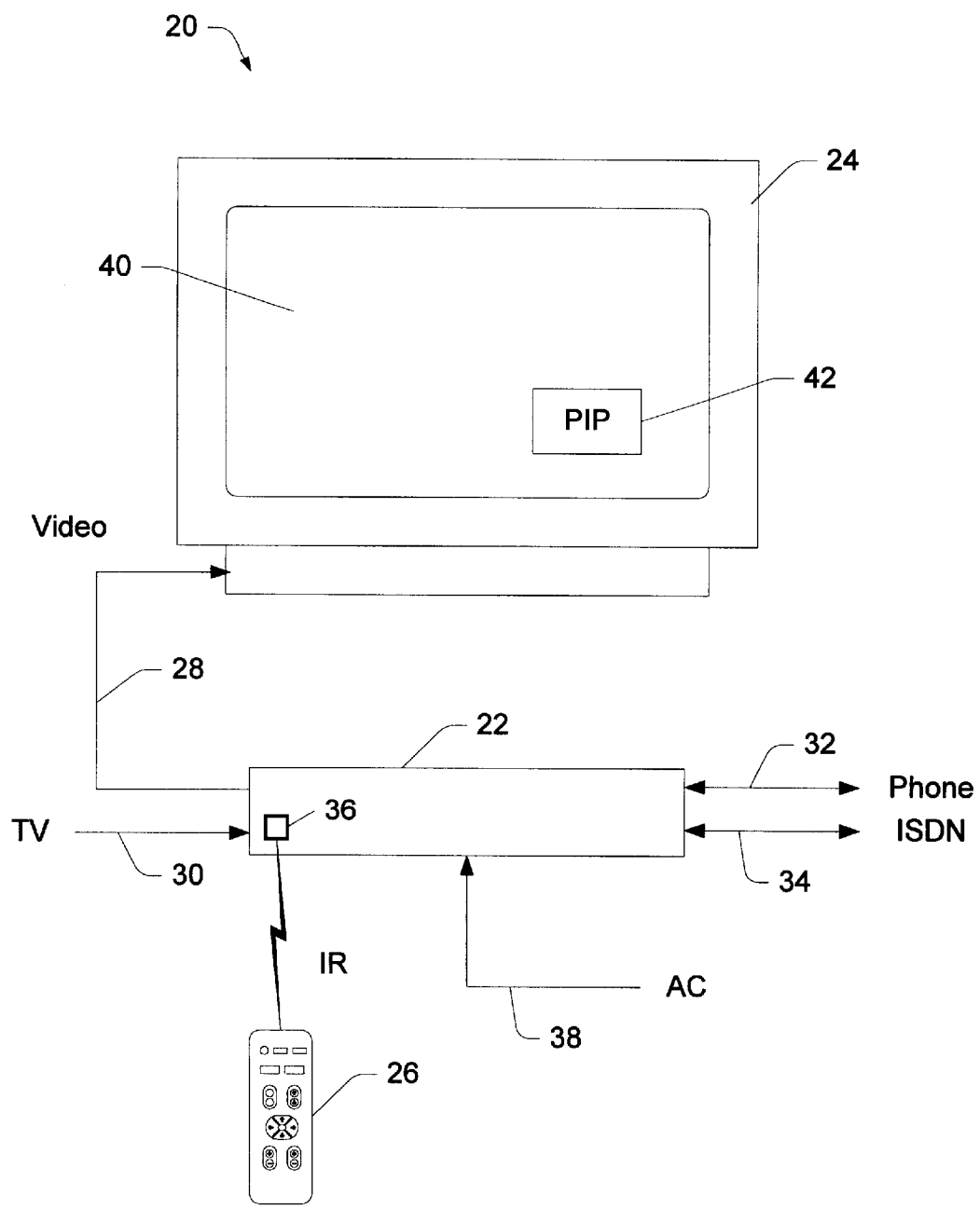
FIG. 1 illustrates a television system that implements an image reduction filter according to an aspect of this invention.

FIG. 1 shows a television system 20 that implements the resizing and filtering techniques described in this disclosure. The television system 20 includes a set-top box 22, an ordinary television set 24, and a remote control 26. The system 20 uses the television set 24 as a display device for displaying video data and for browsing content on the World Wide Web. The set-top box 22 is coupled to the television set 24 by a video link 28, such as RF (radio frequency), S-video, composite video, or other equivalent form of video link. Although FIG. 1 shows the STB implemented separately from the television set, the STB functionality may alternatively be integrated into the television set.

The set-top box 22 includes hardware and/or software for receiving and decoding a TV signal 30, such as an NTSC, Phase Alternate Lines (PAL), Sequential Couleur Avec Memoire (SECAM), High Definition Television (HDTV), or other TV signal, and providing video data to the television set via video link 28. The STB 22 includes a standard modem and an ISDN modem to support a telephone connection 32 or an ISDN connection 34. The set-top box 22 has an IR interface 36 to receive IR signals from the remote control 26. Power line 38 provides power to the STB 22.

The television system 20 has picture-in-picture (or PIP) functionality. The video stream carries pixel data to display a full-size image on screen 40 of the television 24. When activated, the television system 20 can resize and filter the video stream to display a reduced-size image within a small area on the screen 40, such as within a PIP box 42. In this manner, video streams from two different channels may be displayed simultaneously on the screen 40. Alternatively, one video stream from a channel can be overlaid on other background content, such as Web content received from a Web site. Methods for resizing and filtering a video stream to produce a reduced-size display image are described below in more detail.

Figure 2:
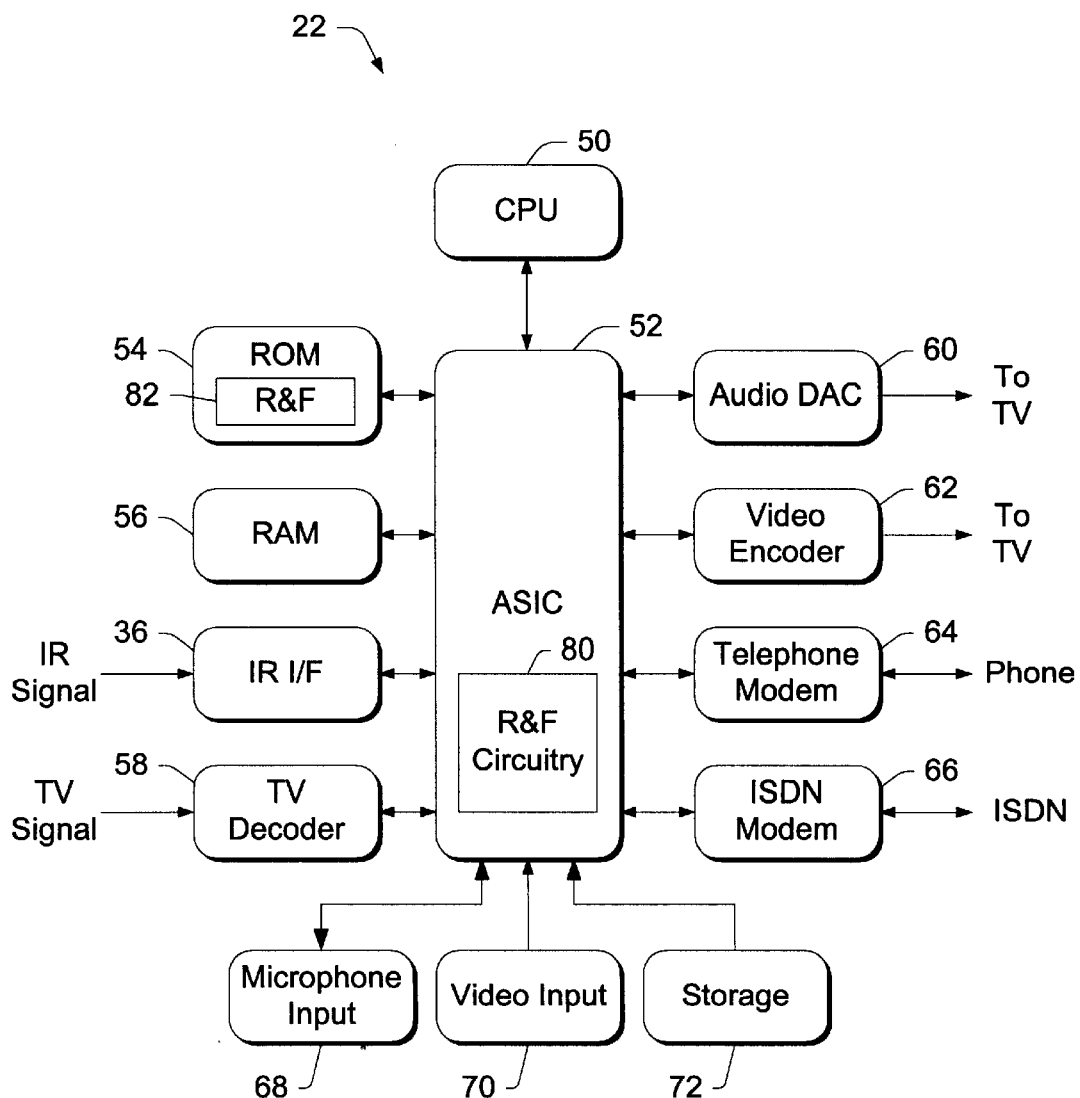
FIG. 2 is a block diagram of a set-top box employed in the television system.

FIG. 2 shows the internal components of the set-top box 22. It has a central processing unit (CPU) 50 coupled to an application-specific integrated circuit (ASIC) 52. The CPU 50 executes software designed to implement features of the present invention and to control operation of the television. ASIC 52 contains circuitry to implement certain features provided by the television system and forms a communications chip that interfaces other STB components.

ASIC 52 is coupled to a Read Only Memory (ROM) 54 and a Random Access Memory (RAM) 56. ROM 54 stores program code for implementing the browser software to be executed by the set-top box 22. ROM 54 may be a programmable ROM (PROM) or any form of erasable PROM (EPROM) or Flash memory.

The IR interface 36 detects IR signals transmitted by remote control 26 and converts them to electrical signals input to the ASIC 52. A television decoder 58 decodes television signals received from a television source, such as cable, satellite, or antenna. ASIC 52 is coupled to an audio digital-to-analog converter (DAC) 60 and a video encoder 62, which provide audio and video output to the television. ASIC 52 is further coupled to a standard telephone modem 64 and an ISDN modem 66.

The STB 22 is equipped with a microphone input 68 to receive audio input and a video input 70 to receive video input from, for example, a video camera. A storage 72 is coupled to ASIC 52 to store the audio/video clips captured at the client. The storage 72 includes any suitable medium for storing electronic data, such as magnetic disks, optical disks, and the like.

The set-top box 22 also implements a resizing and filtering component to resize and filter a video data stream. This component can be implemented in hardware, as represented by resizing and filtering (R&F) circuitry 80 in ASIC 52. The resizing and filtering circuitry 80 can be incorporated into, for example, graphics circuitry formed in the ASIC. Alternatively, the resizing and filtering component may be implemented in software/firmware, as represented by R&F program code 82 embedded in ROM 54.

Resizing and Filtering Operation

Figure 3:
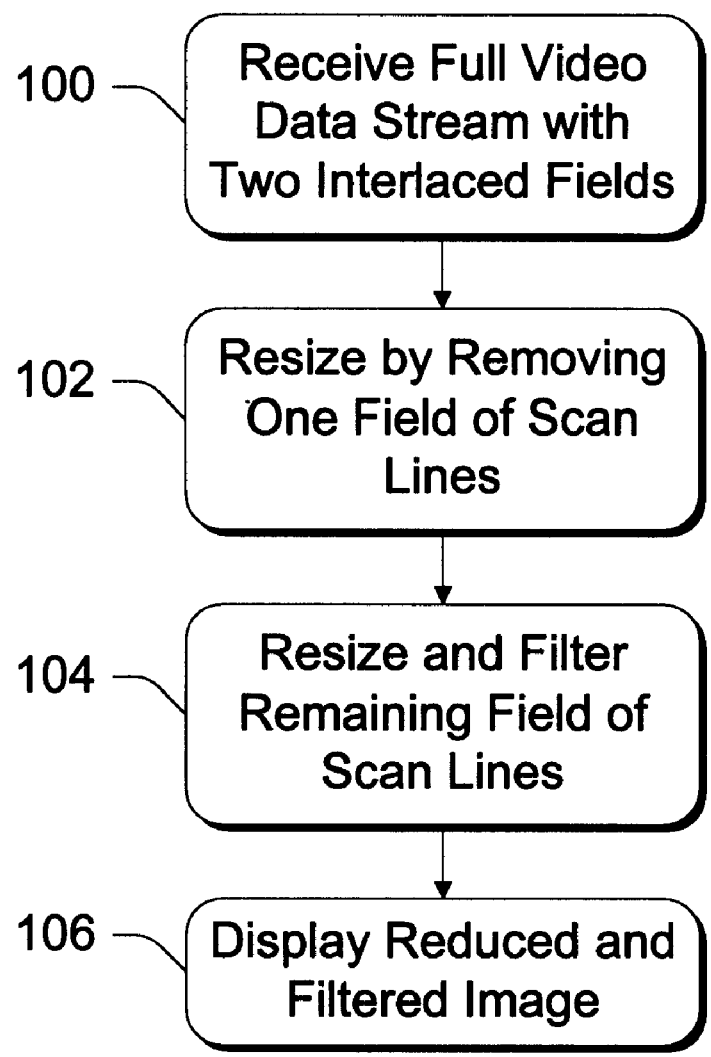
FIG. 3 is a flow diagram showing steps in a method for resizing and filtering a video data stream for display on a television or other display.

FIG. 3 shows steps in a method for resizing and filtering a video data stream for display in small areas, such as a PIP window. The steps are performed by computer-executable instructions stored in memory, or by specific hardware circuitry that contain hardwired logic for performing the steps, or by any combination of programmed computer components and custom hardware components.

At step 100, the set-top box 22 receives a video stream over the TV line 30 or ISDN line 34, or via the video input 70. The video stream contains data for linear scan lines, with each scan line having many pixels. As an example, a common video stream is formatted for a 640×480 display, which consists of 480 scan lines with 640 pixel values in each line.

As is conventional, the video stream interlaces two fields. Consider, for example, an interlaced video stream having twelve scan lines and any number of pixels wide. The twelve scan lines comprise six pairs of lines, where each pair has one line associated with an "even" field and one line associated with an "odd" field. This is represented as follows:

$A_{odd}$
$A_{even}$
$B_{odd}$
$B_{even}$
$C_{odd}$
$C_{even}$
$D_{odd}$
$D_{even}$
$E_{odd}$
$E_{even}$
$F_{odd}$
$F_{even}$ Notice that the odd and even fields of the line pairs are interlaced so that the odd and even fields can be output at alternating times. After one field is output and begins to fade, the other field is output to replace the fading first field. This alternating pattern results in a continual refreshing of the displayed image. The lines are refreshed at a high frequency that is imperceptible to the human eye, so that the image appears constant to the viewer. Conventional TVs and computer monitors operate at 60 Hz, meaning that the whole screen is refreshed once every $\frac{1}{60}$ or 0.01667 second. In contrast, the human eye only begins to perceive a non-constant flickering at a much slower frequency of about 10 Hz.

At step 102, the method removes one of the fields as a first step in reducing the size of the image. It is immaterial which field is eliminated, and either one can be discarded. Removing one field reduces the number of scan lines and hence, the amount of data, by one-half. For example, the number of scan lines for a normal 640×480 display are reduced from 480 lines to 240 lines. This one-half reduction effectively reduces the scanning frequency from 60 Hz to 30 Hz, which still produces an image that appears constant to the human eye.

The reduced set of scan lines can be represented as follows, with the field designation removed:

A
B
C
D
E
F

At step 104, the resizing and filtering component simultaneously performs a second downsizing and anti-flicker filtering, using the following equation [1]:

$$(\text{Line}_{index+1-ratio})/4 + (\text{Line}_{index} + \text{Line}_{index+1})/4 + (\text{Line}_{index+ratio})/4 \quad [1]$$

The term "Line" is a scan line of the input image, such as lines A–F. The term "Ratio" is the amount of scaling to be performed. For a scaling factor of 2:1, "Ratio" is equal to two. For a scaling factor of 3:2, "Ratio" is 1.5.

"Index" is a scan line number of the input image. Its value starts at zero and increments in steps of the "Ratio".

The resize and filter equation [1] averages pairs of sequential lines, as represented by the middle term "$(\text{Line}_{index} + \text{Line}_{index+1})/4$". Averaging two sequential lines has the effect of "blurring" adjacent lines to compensate for missing interlaced lines of the dropped field. The totality of the elements in the resize and filter equation [1] achieve size reduction of the image while minimizing aliasing and removing interlace flicker caused by dropping the intermediate scan lines of the removed field.

It is noted that the resize and filter component averages sequential line pairs regardless of the scaling power used. That is, the process averages two sequential scan lines regardless of whether scaling by a power of two (e.g., a 4:1 reduction) or by other powers (e.g., a 3:2 reduction).

To demonstrate the resize and filter process of step 104, consider the following cases for a 2:1 reduction and a 3:2 reduction. In the 2:1 case involving six scan lines 0–5 or A–E, the ratio is 2 and the index is [0, 2, 4] or [A, C, E]. For an index value of 2, the resize and filter process becomes:

$$(\text{Line}_{2+1-2})/4 + (\text{Line}_{2+Line2+1})/4 + (\text{Line}_{2+2})/4 \quad [2]$$

$$(\text{Line}_1)/4 + (\text{Line}_2 + \text{Line}_3)/4 + (\text{Line}_4)/4 \quad [3]$$

$$(B)/4 + (C+D)/4 + (E)/4 \quad [4]$$

$$(B+C+D+E)/4 \quad [5]$$

Accordingly, one scan line of the output image for the 2:1 reduction factor is:

$$(B+C+D+E)/4 \quad [5]$$

Notice that the uppermost scan line A and the lowest scan line F are dropped. This is beneficial in that the resize and filter process uses fewer input pixels to produce the output pixel.

For the 3:2 case involving six scan lines 0–5 or A–E, the ratio is 1.5 and the index is [0, 1.5, 3.0, 4.5] or [A, B, D, E]. For an index value of 1.5, the resize and filter process becomes:

$$(\text{Line}_{1.5+1-1.5})/4 + (\text{Line}_{1.5} + \text{Line}_{1.5+1})/4 + (\text{Line}_{1.5+1.5})/4 \quad [6]$$

$$(\text{Line}_1)/4 + (\text{Line}_{1.5} + \text{Line}_{2.5})/4 + (\text{Line}_3)/4 \quad [7]$$

$$(B)/4 + (B+C)/4 + (D)/4 \quad [8]$$

$$B/2 + C/4 + D/4 \quad [9]$$

When the index value is 3.0, the resize and filter process becomes:

$$(\text{Line}_{3+1-1.5})/4 + (\text{Line}_3 + \text{Line}_{3+1.5})/4 + (\text{Line}_{3+1.5})/4 \quad [10]$$

$$(\text{Line}_{2.5})/4 + (\text{Line}_3 + \text{Line}_{4.5})/4 + (\text{Line}_{4.5})/4 \quad [11]$$

$$(C)/4 + (D+E)/4 + (E)/4 \quad [12]$$

$$C/4 + D/4 + E/2 \quad [13]$$

Accordingly, two scan lines of the output image for the 3:2 reduction factor is the combined set of equations [9] and [13], as follows:

$$B/2 + C/4 + D/4 \quad [9]$$

$$C/4 + D/4 + E/2 \quad [13]$$

Again, notice that the uppermost scan line A and the lowest scan line F are dropped. As a result, the resize and filter process uses just four input pixels to produce the output pixel.

The resizing and filtering component is constructed to implement the resizing and filtering operations represented by at least one of the equations [5] and [9], [13]. The component requires few input samples (e.g., only four input pixels for each pixel output) in comparison to a fall, multi-tap filter. This enables a reduction in memory bandwidth and makes it possible to implement in software with few shift and add operations. Accordingly, the methods may be implemented using simple graphics hardware or optimized software.

Although the methods of this invention are described for reductions having a factor of 2 and 3:2, the methods can be applied to other reduction factors.

At step 106, the reduced and filtered image is displayed on the television set 24 within the reduced area 42. The displayed image appears constant and is void of perceptible interlace flicker.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for processing a video data stream having first and second fields of interlaced scan lines, comprising the following steps:

removing the first field of interlaced scan lines, the second field of interlaced scan lines comprising only even numbered scan lines or only odd numbered scan lines;

resizing the second field of interlaced scan lines by averaging pairs of sequential scan lines to produce averaged line pairs;

filtering the averaged line pairs to remove interlace flicker; and wherein the resizing and filtering, the averaged line pairs are selected based on a flexible scaling factor.

2. A method as recited in claim 1, further comprising the step of displaying a reduced-size image produced from the averaged line pairs after said step of filtering.

3. A computer readable medium storing computer-executable instructions to process a video data stream having first and second fields of interlaced scan lines, the computer-executable instructions comprising instructions for performing the steps as recited in claim 1.

4. A method for processing a video data stream having first and second fields of interlaced scan lines, comprising the following steps:

removing the first field of interlaced scan lines to leave the second field of sequential scan lines; and resizing and filtering the second field of scan lines as follows:

$$(\text{Line}_{index+1-ratio})/4 + (\text{Line}_{index} + \text{Line}_{index+1})/4 + (\text{Line}_{index+ratio})/4$$

wherein "Line" is a scan line, "Ratio" is an amount of scaling to be performed, and "Index" is a scan line number that starts at zero and increments in steps of the "Ratio".

5. A method as recited in claim 4, further comprising the step of displaying the set of scan lines after said resizing and filtering step.

6. A computer readable medium storing computer-executable instructions to process a video data stream having first and second fields of interlaced scan lines, the computer-executable instructions comprising instructions for performing the steps as recited in claim 4.

7. A method for processing a video data stream having first and second fields of interlaced scan lines, comprising the following steps:

removing the first field of interlaced scan lines to leave the second field of sequential scan lines, wherein a set of six of the sequential scan lines can be represented as A, B, C, D, E, and F; and resizing and filtering the set of six sequential scan lines as follows:

$$(B+C+D+E)/4.$$

8. A method as recited in claim 7, further comprising the step of displaying the set of scan lines after said resizing and filtering step.

9. A computer readable medium storing computer-executable instructions to process a video data stream having first and second is fields of interlaced scan lines, the computer-executable instructions comprising instructions for performing the steps as recited in claim 7.

10. A method for processing a video data stream having first and second fields of interlaced scan lines, comprising the following steps:

removing the first field of interlaced scan lines to leave the second field of sequential scan lines, the second field of scan lines comprising only even scan lines or only odd scan lines, wherein a set of six of the sequential scan lines can be represented as A, B, C, D, E, and F; and resizing and filtering the set of single scan lines as follows:

$$B/2+C/4+D/4 \text{ and } C/4+D/4+E/2.$$

11. A method as recited in claim 10, further comprising the step of displaying the set of scan lines after said resizing and filtering step.

12. A computer readable medium storing computer-executable instructions to process a video data stream having first and second fields of interlaced scan lines, the computer-executable instructions comprising instructions for performing the steps as recited in claim 10.

13. A method for processing a video data stream having first and second fields of interlaced scan lines, comprising the following steps:

removing the first field of interlaced scan lines to leave the second field of sequential scan lines, wherein a set of six of the sequential scan lines can be represented as A, B, C, D, E, and F; and resizing the second field of sequential scan lines by a factor 2:1 as follows:

$$(A+B)/2$$

$$(C+D)/2$$

$$(E+F)/2.$$

14. A computer readable medium storing computer-executable instructions to process a video data stream having first and second fields of interlaced scan lines, the computer-executable instructions comprising instructions for performing the steps as recited in claim 13.

15. A system for processing a video data stream having first and second fields of interlaced scan lines, comprising:

a data input to receive the video data stream;

a resizing and filtering component to remove the first field of interlaced scan lines and resize the second field of interlaced scan lines by averaging pairs of sequential scan lines to produce averaged line pairs, the second field of interlaced scan lines comprising only even numbered scan lines or comprising only odd numbered scan lines, the resizing and filtering component filtering the averaged line pairs to reduce interlace flicker, wherein the resizing and filtering component selects the averaged line pairs based on a flexible scaling factor.

16. A system as recited in claim 15, wherein the resizing and filtering component is embodied as a circuit.

17. A system as recited in claim 15, further comprising a processor and a memory, and wherein the resizing and filtering component is embodied as executable code stored in the memory and executed on the processor.

18. A set-top box comprising the system as recited in claim 15.

19. A television comprising:

the system as recited in claim 15; and a display to display an output video data stream output by the resizing and filtering component.

20. A system for processing a video data stream having first and second fields of interlaced scan lines, comprising:

means for removing the first field of interlaced scan lines;

means for resizing and filtering the second field of scan lines as follows:

$$(\text{Line}_{index+-ratio})/4+(\text{Line}_{index}+\text{Line}_{index+1})/4+(\text{Line}_{index+ratio})/4$$

wherein "Line" is a scan line, "Ratio" is an amount of scaling to be performed, and "Index" is a scan line number that starts at zero and increments in steps of the "Ratio".

21. A method as recited in claim 20, further comprising means for displaying a reduced-size image produced from the averaged and filtered line pairs.

* * * * *

UNITED STATES PATENT AND TRADEMARK OFFICE
CERTIFICATE OF CORRECTION

PATENT NO. : 6,380,985 B1  Page 1 of 1
DATED : April 30, 2002
INVENTOR(S) : Sean Callahan It is certified that error appears in the above-identified patent and that said Letters Patent is hereby corrected as shown below:

Column 1,
Line 13, replace "fall-size" with -- full-size --.
Line 17, replace "fall-size" with -- full-size --.

Column 2,
Line 14, replace "fall" with -- full --.

Column 6,
Line 12, replace "fall" with -- full --.

Column 7,
Line 26, delete "is" after "second".

Signed and Sealed this

Sixteenth Day of July, 2002

Attest:

JAMES E. ROGAN
Attesting Officer    Director of the United States Patent and Trademark Office